United States Patent Office 2,842,585
Patented July 8, 1958

2,842,585

ORGANIC ESTERS OF 2-(2-DIETHYLAMINO-ETHOXY)-ETHANOL AND THEIR PROCESS OF PREPARATION

Henri Morren, Forest-Brussels, Belgium, assignor to Union Chimique Belge, Societe Anonyme, Brussels, Belgium, a Belgian company No Drawing. Application March 23, 1954
Serial No. 418,238

Claims priority, application Belgium June 26, 1953

5 Claims. (Cl. 260—469)

This invention relates to organic esters of 2-(2-diethylamino-ethoxy)-ethanol

I have found that certain of these esters and their hydrochlorides and acid citrates possess considerable spasmolytic power.

I have found that whilst the desired esters may be prepared by the methods commonly employed for esterification, it is preferable to esterify the said amino alcohol with a carbonyl halogenide of the selected organic acid, with or without the use of a hydrogen chloride acceptor, or to make the trans-esterification of the methyl or ethyl ester of the selected organic acid by means of the said amino alcohol with liberation of methanol or ethanol respectively.

The esters and their hydrochlorides or acid citrates according to my invention, and their preparation, are described in the following examples.

EXAMPLE 1

2-(2-diethylamino-ethoxy)-ethyl ester of 1-phenyl-1-cyclopentanecarboxylic acid and its hydrochloride

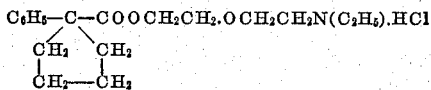

A mixture of 0.5 mol of 1-phenyl-1-cyclopentanecarbonyl chloride and of 0.5 mol of 2-(2-diethylamino-ethoxy)-ethanol in 300 mls. of toluene is heated under reflux for 20 hours. The mixture is thereafter made alkaline by means of an aqueous solution of caustic soda and decanted; the toluenic layer is washed with water and concentrated in vacuo. The residue is distilled under high vacuum. After two fractional distillations there is obtained, in 85 percent yield, the desired ester in the form of its base. Boiling point 164° C./0.1 mm. Hg.

The corresponding hydrochloride is prepared by dissolving the base in ether and by treating it with an ethereal solution of hydrochloric acid. The salt may be recrystallized by dissolving it in very little alcohol or acetone followed by the addition of ether. Melting point 71–72° C.

EXAMPLE 2

2-(2-diethylamino-ethoxy)-ethyl ester of 1-phenyl-1-cyclohexanecarboxylic acid and its hydrochloride

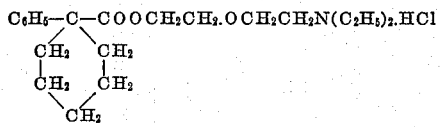

This ester is obtained as in Example 1 by reacting 1-phenyl-1-cyclohexanecarbonyl chloride and the amino alcohol.

Boiling point of the ester 173° C./0.1 mm. Hg. The hydrochloride is prepared in ether.

EXAMPLE 3

2-(2-diethylamino-ethoxy)-ethyl ester of 4-phenyl-4-tetrahydropyranecarboxylic acid and its acid citrate

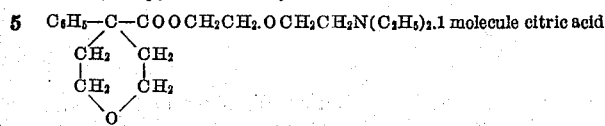

The ester is prepared as in Example 1 by means of 4-phenyl-4-tetrahydropyranecarbonyl chloride and the amino alcohol. Boiling point of the ester 170° C./0.02 mm. Hg. The acid citrate is prepared in ether.

EXAMPLE 4

2-(2-diethylamino-ethoxy)-ethyl ester of 1-phenyl-1-cyclopropanecarboxylic acid and its acid citrate

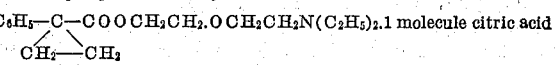

According to Example 1,1-phenyl-1-cyclopropanecarbonyl chloride and the amino alcohol are allowed to react. Boiling point of the ester 145° C./0.02 mm. Hg. The acid citrate, prepared in ethereal medium, is hygroscopic.

EXAMPLE 5

2-(2-diethylamino-ethoxy)-ethyl ester of diphenylacetic acid and its acid citrate

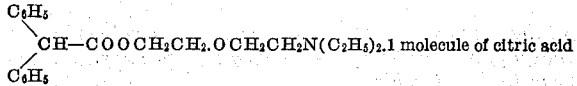

The reaction of the diphenylacetyl chloride and of the amino alcohol is carried out as in Example 1. Boiling point of the ester 175° C./0.02 mm. Hg. The acid citrate, prepared in an ethereal medium (1 mol of ester and 1 mol of citric acid), is hygroscopic.

EXAMPLE 6

2 - (2 - diethylamino-ethoxy)-ethyl ester of phenylcyclohexylacetic acid and its acid citrate

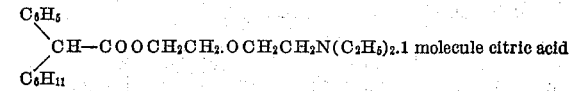

The ester may be obtained according to the method of Example 1 from the phenylcyclohexylacetyl chloride and the amino alcohol. Boiling point 165° C./0.01 mm. Hg.

The acid citrate is prepared in ether. The product may be recrystallized by dissolving it in very little alcohol with the addition of ether. The corresponding hydrochloride is extremely hygroscopic.

EXAMPLE 7

2 - (2 - diethylamino - ethoxy) - ethyl ester of phenyl-(2-thenyl)-acetic acid and its acid citrate

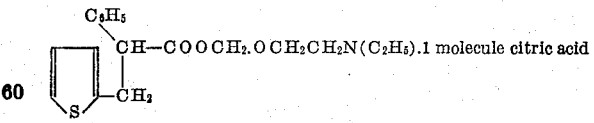

A mixture of 0.1 mol phenyl-(2-thenyl)-acetyl chloride (boiling point 155–160° C./0.5 mm. Hg) and of 0.1 mol of the amino alcohol in 100 mls. of pyridine is heated with reflux for one hour. The mixture is shaken in 1 litre of water and extracted twice by means of benzene and the extract is washed with water. After evaporation of the solvent, the residue is distilled under high vacuum. The ester is obtained in a 75 percent yield. Boiling point of the ester 175–180° C./0.01 mm. Hg.

The acid citrate is prepared in ether from equimolar quantities of the ester and citric acid.

EXAMPLE 8

*2-(2-diethylamino-ethoxy)-ethyl ester of phenyl-(2-furfuryl)-acetic acid*

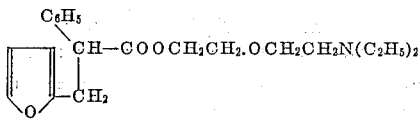

0.3 gram of metallic sodium are dissolved in 12 grams of 2-(2-diethylamino-ethoxy)-ethanol and there are added thereto 9 grams of methyl phenyl-(2-furfuryl)-acetate (boiling point 117–118° C./0.05 mm. Hg). The methanol formed and the excess of amino alcohol are distilled off. The residue is taken up by means of benzene and washed with water. After evaporation of the solvent, the product obtained by transesterification is distilled at high vacuum. There are obtained 7.9 grams of the ester (boiling point 150° C./0.01 mm. Hg).

The methyl phenyl-(2-furfuryl)-acetate is obtained by the action of 2-furfuryl chloride on the sodium salt of phenyl-acetonitrile, followed by the saponification of the phenyl-(2-furfuryl)-acetonitrile (boiling point 167–170° C./13 mm. Hg) and the esterification of the carboxyl group.

The phenyl-(2-furfuryl)-acetic acid (melting point 101° C.) is methylated in an ethereal medium by the addition of an excess of diazomethane.

EXAMPLE 9

*2-(2-diethylamino-ethoxy)-ethyl ester of 1-(alphacyclohexyl-p.methoxybenzyl) - 4 - piperazinecarboxylic acid and its dihydrochloride*

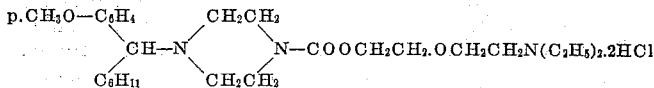

This ester is prepared according to the method given in Example 8 by the transesterification of the corresponding ethyl carboxylate by means of amino alcohol in excess, in the presence of metallic sodium. Boiling point of the ester 260° C./0.005 mm. Hg (with slight decomposition).

The dihydrochloride is obtained by dissolving the ester in acetone and by saturating the solution with gaseous hydrochloric acid. The salt is thereafter precipitated by the addition of ether.

The ethyl - 1-(alpha-cyclohexyl-p.methoxybenzyl)-4-piperazinecarboxylate (boiling point 205° C./0.05 mm. Hg) is prepared in 70 percent yield by the reaction of 0.2 mol of monocarbethoxypiperazine with 0.1 mol of alpha-cyclohexyl-p-methoxybenzyl chloride (melting point 98° C.) obtained from the corresponding alcohol. After cooling, the mass is taken up with water, rendered alkaline by means of caustic soda and extracted with benzene. The benzene solution is washed with water and concentrated and the residue distilled in vacuo.

I claim:

1. A compound selected from the group consisting of an ester having the formula $$R—COOCH_2CH_2OCH_2CH_2N(C_2H_5)_2$$

wherein R is a radical selected from the group consisting of

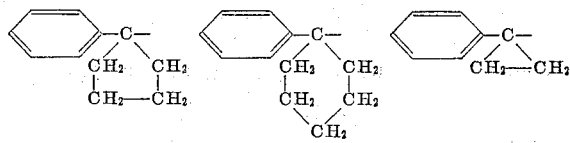

its citrates and its hydrochlorides.

2. The compound having the formula

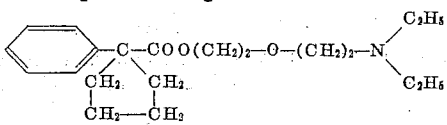

3. A process for producing an ester having the formula $$R—COOCH_2CH_2OCH_2CH_2N(C_2H_5)_2$$

wherein R is a radical selected from the group consisting of

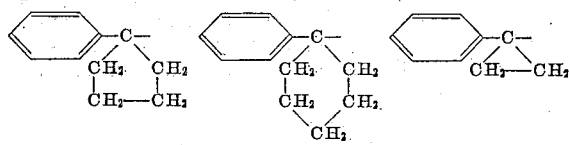

which comprises esterifying 2-(2-diethylamino-ethoxy)-ethanol with a derivative of a carboxylic acid having the formula R—COOH, said derivative being selected from the group consisting of a lower alkyl ester and the carbonyl chloride.

4. A process as defined in claim 3, wherein the derivative is the carbonyl chloride.

5. A process as defined in claim 3, wherein the derivative is a lower alkyl ester.

References Cited in the file of this patent

UNITED STATES PATENTS 2,512,307    Clinton et al. _____ June 20, 1950